Patented Sept. 18, 1945

2,384,818

UNITED STATES PATENT OFFICE 2,384,818

PREPARATION OF AMINO CARBOXYLIC ACIDS AND THEIR SALTS

George O. Curme, Jr., White Plains, N. Y., and Henry C. Chitwood and Jared W. Clark, Charleston, W. Va., assignors to Carbide and Carbon Chemicals Corp., a corporation of New York No Drawing. Original application December 20, 1941, Serial No. 423,756. Divided and this application December 23, 1944, Serial No. 569,626

9 Claims. (Cl. 260—531)

The conversion of alcohols to the alkali metal salts of their corresponding carboxylic acids by heating the alcohols with alkali metals or alkali metal hydroxides has been known since the work of Dumas and Stas (Ann., 35, 129-173, 1840). Many variations and special adaptations of this reaction have since been investigated, but the method has not heretofore been known to be applicable to those alcohols which contain functional groups which are readily attacked by strong alkalies or which are easily oxidized. The amino alcohols are of this type, and it is well known that amino groups in general are themselves strongly reactive and susceptible to attack both by alkalies and in oxidizing reactions.

These known propensities of the amino compounds apparently have excluded, at least to the present, the amino alcohols from the class of alcohols known to be useful in the reaction of Dumas and Stas.

The present invention is based on the unexpected discovery that amino alcohols can be subjected to alkaline oxidation with the resultant formation of the alkali metal salts of the corresponding amino carboxylic acids, and that this can be accomplished under many conditions without serious attack on the amino groups. The advantages and value of the invention will be apparent.

The process of the invention proceeds with the liberation of hydrogen according to the following scheme, in which the formation of the potassium salt of amino acetic acid (glycine) is shown for illustration:

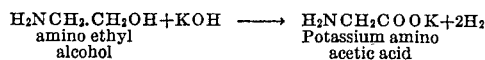

This invention can be applied to the oxidation of monoamino monohydric alcohols, to the oxidation of monoamino polyhydric alcohols and of polyamino polyhydric alcohols. By "amino," "polyamino," "amino carboxylic acids," and similar terms employed in this description and in the appended claims, there is meant not only those compounds containing the amino group, —NH₂, but also those in which the nitrogen atom is attached to two or three carbon atoms, as in mono- or dialkylated amino alcohols and in the dialkanol- and trialkanol-amines. Also, it is to be understood that when "alcohols," "amino alcohols" and similar terms are mentioned, the alcohol groups referred to for the purposes of this invention are primary groups, that is, the —OH groups are attached to terminal carbon atoms.

In addition to the oxidation of amino ethyl alcohol, as illustrated above, this process can be applied to the formation of salts of various other amino carboxylic acids by analogous reactions, and the amino alcohols oxidized may contain alkyl, aryl or aralkyl groups, or combinations of these. The hydroxides of sodium and potassium are the alkalies most conveniently useful for the practice of the invention, but equivalent strong alkalies can be used. Where both sodium and potassium hydroxides are equally soluble in the amino alcohol undergoing reaction, there is usually little or no difference in the chemical action of these in the process. The free amino carboxylic acids may be formed from the alkali metal salts initially obtained by reaction of these with various acids. In this respect, the present invention does not differ from the previously known conversion of the salts of carboxylic acids generally to the free acids, and mineral or organic acids may be used for the purpose.

The oxidation of these amino alcohols by heating in the presence of caustic alkalies requires the observation of various precautions which are unnecessary in the case of the simple alcohols. The more important of these include, in the case of amino alcohols containing a nitrogen atom attached to only one or two carbon atoms, the avoidance of water in substantial amounts during the reaction, since its presence seems to promote attack of the primary and secondary amino groups, and, in general, the avoidance of high temperatures in the heating because of the tendency toward thermal instability of many of the amino carboxylic acids and their salts. The oxidation of amino alcohols in which the nitrogen is attached to three carbon atoms seems to be influenced much less adversely by the presence of water than oxidations of amino alcohols containing primary or secondary amino groups.

The process will be illustrated by the following examples:

*Example I.—Glycine*

A mixture of 61 grams (1 mol) of monoethanolamine and 112 grams of 85% potassium hydroxide (1.7 mols) was placed in a steel reaction vessel equipped with a reflux condenser and heated by an oil-bath. The gas evolved was passed through a water scrubber to remove any ethanolamine carried by it and was then measured. This mixture was heated for 60 hours at an oil-bath temperature of 210° C., and the crude product was then washed from the reaction vessel with water. The gas evolved, which was virtually pure hydrogen, was 42.7 liters. To the aqueous solution of crude product were added 80 grams of acetic acid and the whole was then evaporated to dryness.

The dry residue was dissolved in 50 grams of water, after which 30 grams of acetic acid and 200 grams of methyl alcohol were added to this solution. A precipitate formed which was removed, and which was found to be 19 grams of potassium oxalate. On adding additional methyl alcohol, amounting to a total of 1050 grams, a crystalline solid precipitated. This material was found on analysis to contain 69.2% glycine. The yields of products obtained amounted to 34.9% glycine and 10.3% potassium oxalate. The ethanolamine recovered was 23.5%.

In a second experiment conducted in the same way using the same amounts of materials, the reaction was continued for 32 hours with an oil-bath temperature of 230° C. The gas evolved was 44.8 liters. The yield of glycine obtained was 33% and that of potassium oxalate was 12.0%.

Another experiment was carried out as described above using the same amounts of materials and a reaction period of 13 hours with an oil-bath temperature of 240° C. The gas evolved amounted to 45.6 liters, and the yields were 32.2% of glycine and 11.0% of potassium oxalate.

Sodium hydroxide could not be used in this reaction with any marked degree of success because it was not sufficiently soluble in the ethanolamine. While aqueous solutions of sodium hydroxide formed a solution with monoethanolamine, the presence of water promoted attack of the amino group to such an extent as to render this form of the process undesirable for most practical purposes.

This adverse effect of water was illustrated by an experiment in which 18 grams (1 mol) of water were added to the same reactants in the same quantities as set out above. The reaction was carried out as described for a period of 33 hours with an oil-bath temperature of 240° C. Although 42.9 liters of gas were evolved, the yield of glycine was only 3.3% and the yield of potassium oxalate was 16.1%.

*Example II.—Tetracarboxymethyl ethylene diamine*

A mixture of 118 grams (0.5 mol) of tetraethanol ethylene diamine,

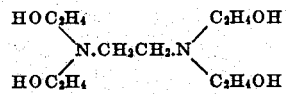

and 198 grams of 85% potassium hydroxide (3.0 mols) was placed in a steel reaction vessel connected to a meter for the measurement of evolved gas. This reaction vessel was heated in an oil-bath maintained within the range of 230° to 260° C. at which temperatures the evolution of gas was brisk. The extent of the reaction was followed by periodic titration of samples to determine the calcium ion sequestration power of the product in comparison with that of the sodium salt of tetracarboxymethyl ethylene diamine of known purity.

After 14 hours of reaction the gas evolved amounted to 55 liters, which by analysis, was found to be essentially pure hydrogen. At this point, titration indicated that the reaction mixture contained 12.8% by weight of tetrapotassium carboxymethyl ethylene diamine or its equivalent in calcium sequestering power. After 17 hours reaction, the gas evolved measured 66 liters and the content of tetrapotassium carboxymethyl ethylene diamine was 17.5% by weight. From this point, continuation of the reaction resulted in a decrease of the content of the salt in the product.

Aqueous solutions of the tetrapotassium carboxymethyl ethylene diamine salt obtained may be treated with an excess of strong mineral acid, such as sulfuric or hydrochloric acids, to set free the tetracarboxymethyl ethylene diamine. This amino acid, when pure, has a low solubility in cold water, in contrast to the ready solubility of its alkali metal salts.

*Example III.—Tetrasodium carboxymethyl ethylene diamine*

A reaction was carried out exactly as described in Example II except that 126 grams of 95% sodium hydroxide (3.0 mols) replaced the potassium hydroxide. The reactants were heated at an oil-bath temperature of 250° to 285° C. After 15 hours, the gas evolved, mainly hydrogen, measured 35 liters, and 15% by weight of the reaction mixture was determined by titration to be tetrasodium carboxymethyl ethylene diamine. Further heating appeared neither to increase greatly the total volume of gas evolved nor to increase materially the yield of product.

*Example IV.—Tetrasodium carboxymethyl ethylene diamine*

A similar reaction was carried out in which the tetraethanol ethylene diamine was heated with an excess of a 30% aqueous solution of sodium hydroxide at an oil-bath temperature of about 275° C.

The reaction mixture showed a calcium sequestering power indicating about 12% of the theoretical yield of tetrasodium carboxymethl ethylene diamine. In this case, the amino groups are tertiary, and comparison with the yield obtained in Example II indicates that the deleterious effect of water was much less noticeable than in the oxidation of the primary ethanolamine.

In the oxidations described in Examples II, III and IV, the reaction was not found to proceed to any significant extent at temperatures much lower than 250° C. The high temperatures required were accompanied by some decomposition of the products, and this makes their preparation in higher yields quite difficult.

*Example V.—Tripotassium carboxymethylamine*

A mixture of 149 grams (1 mol) of triethanolamine, 224 grams (4.0 mols) of potassium hydroxide and 40 grams of water was placed in a steel reaction vessel as described in Example II. This vessel was heated in an oil-bath at a temperature of 210° to 220° C., and gas, essentially pure hydrogen, was evolved. After 16 hours of heating the rate of gas evolution became very low and the total gas volume was 38 liters. Tripotassium carboxymethylamine was obtained in good yield, but the free amino acid could not readily be precipitated from the aqueous solution of its salt because of its high solubility in water.

The temperature necessary for the reaction of this invention depends on the amino alcohol to be oxidized and on the strength of the alkali used. It has been found that the reaction can be carried out at lower temperatures and with greater facility by the aid of certain metals or their compounds as catalysts, and this improvement in the process is the subject of copending application Serial No. 457,515, filed September 5, 1942, by H. C. Chitwood. The common method of operation is to mix the reactants and heat them until a substantial evolution of hydrogen occurs as evidenced either by its escape through the vent of the reaction vessel, or by an increase in pressure if a closed system is used. The temperature then is either held at this point or slowly increased to attain the desired rate of reaction. The completion of the reaction is indicated when the rate of hydrogen evolution becomes very slight, at which time approximately a theoretical amount of gas will have been found to have been given off. The operating pressure is of slight importance except to prevent evaporation of the liquids present. When a high-boiling amino alcohol and very little water are used, as in the preparation of glycine from monoethanolamine, the reaction may be conveniently carried out at atmospheric pressure using a reflux condenser to return any volatilized liquid. With low-boiling amino alcohols, or when substantial amounts of water are present in the reaction, operation under pressure is preferred and this can be conveniently done by applying gas pressure to the reaction system. Using aqueous solutions of the alkali, the reaction is most conveniently conducted in a closed vessel and a pressure of about 300 pounds per square inch of hydrogen or an inert gas is applied to the system. This pressure can be maintained at about 300 pounds per square inch or higher by regulating the rate of gas removal, or it can be permitted to build up throughout the reaction as desired. Increased hydrogen pressure up to 1500 pounds per square inch or more apparently has no noticeable effect on the yield of product.

In addition to the reactions illustrated by the foregoing examples, this process has been employed to form amino carboxylic acids and their alkali metal salts from a wide variety of other amino alcohols, among which are the following: tetracarboxymethyl propylene diamine from tetraethanol propylene diamine; pentacarboxymethyl diethylene triamine from pentaethanol diethylene triamine; hexacarboxymethyl triethylene tetramine from hexaethanol triethylene tetramine; dicarboxymethylamine from diethanolamine; and isopropyl and butyl dicarboxymethylamines from the corresponding isopropyl and butyl diethanolamines.

This application which relates to a process for making the alkali metal salts of primary amino and secondary amino carboxylic acids is a division of application Serial No. 423,756, filed December 20, 1941, which relates to a process for making the alkali metal salts of tertiary amino carboxylic acids.

Many modifications and variations of the process will be apparent to those skilled in the art and these are included within the scope of the invention as defined by the appended claims.

We claim:

1. A process for making an alkali metal salt of an amino carboxylic acid which comprises heating an amino alcohol of the group consisting of primary amino and secondary amino alcohols containing at least one primary alcohol group with an alkali metal hydroxide soluble therein and having a concentration, based on the weight of alkali metal hydroxide and water present therewith, of not less than 85 per cent, at a temperature at which hydrogen is liberated from the reaction mixture, with formation of the corresponding amino carboxylic acid alkali metal salt.

2. A process for making an alkali metal salt of an amino carboxylic acid which comprises heating an amino alcohol of the group consisting of primary amino and secondary amino alcohols containing at least one primary alcohol group with an alkali metal hydroxide soluble therein and having a concentration, based on the weight of alkali metal hydroxide and water present therewith, of not less than 85 per cent, at a temperature at which hydrogen is liberated from the reaction mixture and not substantially higher than 285° C., with formation of the corresponding amino carboxylic acid alkali metal salt.

3. A process for making an alkali metal salt of an amino carboxylic acid which comprises heating an amino alcohol of the group consisting of primary amino and secondary amino alcohols containing at least one primary alcohol group with an excess of an alkali metal hydroxide soluble therein and having a concentration, based on the weight of alkali metal hydroxide and water present therewith, of not less than 85 per cent, at a temperature at which hydrogen is liberated from the reaction mixture, with formation of the corresponding amino carboxylic acid alkali metal salt.

4. A process for making an alkali metal salt of an amino carboxylic acid which comprises heating an amino alcohol of the group consisting of primary amino and secondary amino alcohols containing at least one primary alcohol group with an alkali metal hydroxide of a molecular weight from 40 to 56.1 soluble therein and having a concentration, based on the weight of the alkali metal hydroxide and water present therewith, of not less than 85 per cent, at a temperature at which hydrogen is liberated from the reaction mixture, with formation of the corresponding amino carboxylic acid salt.

5. A process for making an alkali metal salt of an amino carboxylic acid which comprises heating an amino alcohol of the group consisting of primary amino and secondary amino alcohols containing at least one primary alcohol group with an alkali metal hydroxide of a molecular weight from 40 to 56.1 soluble therein and having a concentration, based on the weight of alkali metal hydroxide and water present therewith, of not less than 85 per cent, at a temperature at which hydrogen is liberated from the reaction mixture and not substantially higher than 285° C., with formation of the corresponding amino carboxylic acid salt.

6. A process for making an alkali metal salt of a primary amino carboxylic acid which comprises heating a primary amino alcohol having a primary alcohol group with an alkali metal hydroxide soluble therein and having a concentration, based on the weight of alkali metal hydroxide and water present therewith, of not less than 85 per cent, at a temperature at which hydrogen is liberated from the reaction mixture, with formation of the corresponding primary amino carboxylic acid alkali metal salt.

7. A process for making an alkali metal salt of a primary amino carboxylic acid which comprises heating a primary amino alcohol having a primary alcohol group with potassium hydroxide having a concentration, based on the weight of potassium hydroxide and water present therewith, of not less than 85 per cent, at a temperature at which hydrogen is liberated from the reaction mixture, with formation of the corresponding primary amino carboxylic acid alkali metal salt.

8. A process for making the potassium salt of glycine which comprises heating monoethanolamine with potassium hydroxide having a concentration, based on the weight of the potassium hydroxide and water present therewith, of not less than 85 per cent, at a temperature at which hydrogen is liberated from the reaction mixture, with formation of the glycine potassium salt.

9. A process for making an alkali metal salt of glycine which comprises heating monoethanolamine with potassium hydroxide having a concentration, based on the weight of the potassium hydroxide and water present therewith, of not less than about 85 per cent, at a temperature at which hydrogen is liberated from the reaction mixture and not substantially above 240° C., with formation of the glycine potassium salt.

GEORGE O. CURME, JR.
HENRY C. CHITWOOD.
JARED W. CLARK.